United States Patent [19] [11] 3,703,862
Appenzeller [45] Nov. 28, 1972

[54] WORK PRESSURE ROLLING ASSEMBLY

[72] Inventor: Valentin Appenzeller, Kempen/Niederrhein, Germany

[73] Assignee: Edward Kusters Maschinenfabrik, Krefeld, Germany

[22] Filed: Oct. 21, 1966

[21] Appl. No.: 588,571

Related U.S. Application Data

[63] Continuation-in-part of Ser. No. 375,237, June 15, 1964.

[30] Foreign Application Priority Data

June 25, 1963 Germany............K 50053

[52] U.S. Cl............................100/162 B, 29/113 AD
[51] Int. Cl. .............................................B30b 3/04
[58] Field of Search .............29/116 AD; 100/162 B

[56] References Cited

UNITED STATES PATENTS

| 1,799,775 | 4/1931 | Berry | 100/162 UX |
| 2,908,964 | 10/1959 | Appenzeller | 29/116 |
| 3,023,695 | 3/1962 | Kuster | 100/170 |
| 3,037,557 | 6/1962 | Faeber et al. | 100/162 UX |
| 3,119,324 | 1/1964 | Justus | 100/170 |
| 3,146,160 | 8/1964 | Kankaanpaa | 29/116 UX |
| 3,196,520 | 7/1965 | Appenzeller | 29/116 |
| 3,276,102 | 10/1966 | Justus | 100/170 X |
| 3,286,325 | 11/1966 | Justus | 100/170 X |
| 3,290,897 | 12/1966 | Kuehn | 64/9 |

Primary Examiner—Billy J. Wilhite
Attorney—Kenyon & Kenyon

[57] ABSTRACT

A controlled deflection roll has a relationship of the frame structure which mounts it and the roll structure itself which allows the internal beam of the roll to be anchored and the source of power to the shell of the roll to be located outside of the frame structure.

7 Claims, 10 Drawing Figures

INVENTOR.
VALENTIN APPENZELLER
BY
Kenyon & Kenyon
ATTORNEYS

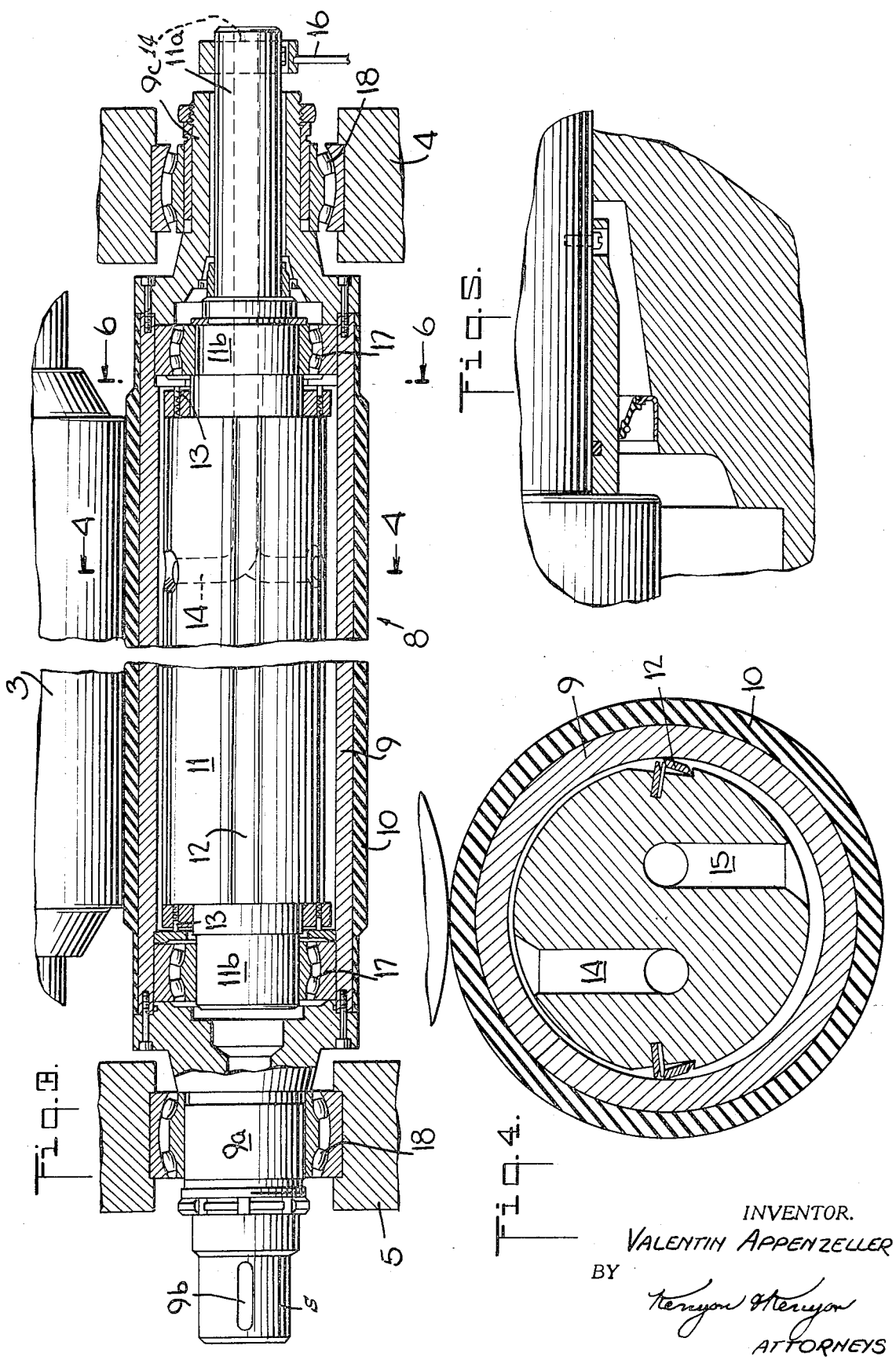

INVENTOR.
VALENTIN APPENZELLER

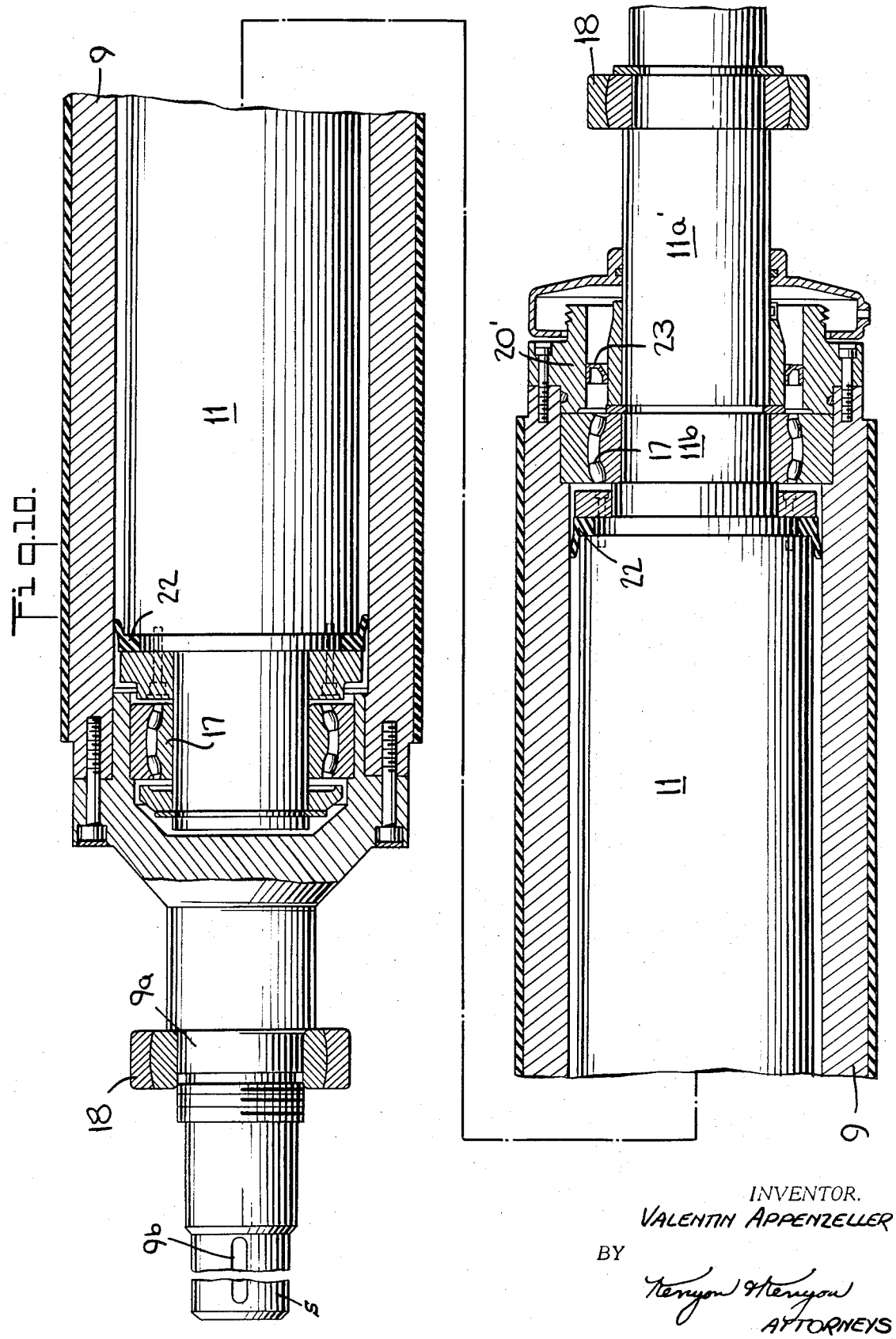

3,703,862

WORK PRESSURE ROLLING ASSEMBLY

This application is a continuation-in-part of U.S.A. application Ser. No. 375,237, filed June 15, 1964, in which priority under German application K50,053, filed June 25, 1963 is claimed.

This invention relates to work pressure rolling assemblies of the type including a roll for pressure rolling the work, and means for controlling the deflection or beam flexure of this roll caused by its application of pressure to the work being pressure rolled.

Examples of this type are shown by the Love U.S. Pat. No. 864,660 dated Aug. 27, 1907, and the Gautschi U.S. Pat. No. 977,725 dated Dec. 6, 1910. In both of these examples, the roll deflection is controlled by applying variable pressure to the outside of the roll at a location opposite to the work. Such an arrangement permits the assembly to use a solid pressure rolling roll having roll necks which extend beyond the outsides of the frame members mounting the journals for the roll. This permits conventional application of rotary power to the roll by direct coupling to the end of one of the projecting necks. However, this arrangement has the disadvantage that the pressure applying means required to control the deflection of the roll works directly on the outside of the roll's work rolling surface so that lubricant used either to reduce friction or for the application of hydraulic pressure to the roll contaminates this surface. Further, any substance picked up by this surface from the work is conveyed directly to the pressure applying means so as to possibly interfere with its operation.

Contrastingly, the Specht U.S. Pat. No. 2,395,915 dated Mar. 5, 1946, and the Appenzeller U.S. Pat. NO. 2,908,964 dated Oct. 20, 1959, disclose arrangements where the pressure applying means required to control deflection os the working roll of the assembly, is on the inside of this roll, the latter being hollow to provide space within which such pressure applying means may be operatively located. This kind of arrangement eliminates the disadvantage described above but introduces a problem concerning rotatively powering the working roll of the assembly because the roll ends are located inside of the frame members.

Heretofore, this problem has been solved either by the use of the roll assembly opposite to a solid conventional roll provided with conventional roll necks to which rotative power could be applied, relying on transmitting power through the work to drive the working roll of the assembly, or by the use of sprocket wheel and chain drives, pulley and belt drives or the like, located inside of the frame members.

Anything located inside of the frame members introduces design, maintenance and operational troubles. Space is restricted, the necessary drive elements are exposed directly to the working area, and these elements may interfere with pressure rolling wide material. Driving the work by the use of a conventional solid roll so that the work frictionally drives the working roll of the described kind of assembly is only a limited solution to the problem.

With the foregoing in mind, one of the objects of the present invention is to provide a work pressure rolling assembly having deflection controlling means on the inside of a hollow work rolling roll, while at the same time permitting the application of rotary power to this roll by connecting it with a source of rotary power located on the outside of the necessary frame members.

Controlled deflection roll assemblies of the type disclosed by the previously mentioned Appenzeller U.S. Pat. No. 2,908,964, have been commercially successful and another object of the present invention is to permit the use of the principles disclosed by this patent while at the same time permitting the hollow roll of this kind of assembly to be driven directly from a location on the outside of the frame members required to mount the roll assembly.

Generally speaking, an assembly of the type to which this invention relates must include a hollow roll having an outer work rolling surface and be subject to deflection when the latter is engaging under pressure the work being pressure rolled. The work must, of course, be in turn supported by another roll which may be either a plain solid roll or another assembly of the same type under discussion. A beam is located within this hollow roll and it extends for at least the length of the work rolling surface of this roll, and means are supplied for applying variable pressure from this beam to the inside of the hollow roll at a location and in a direction providing a reaction to the deflection to which the hollow roll would otherwise be subjected. Sometimes this means may be adjusted to keep the effective work rolling surface on the outside of the hollow roll truly linear, and sometimes it may be adjusted so that this surface is either concave or convex, depending upon the results desired.

The inside of the hollow roll must form a space permitting the beam inside of it to deflect when stressed by the pressure of the above-described means. All structural metals are elastically flexible and, therefore, something must deflect under the work rolling pressure, this being the beam on the inside of the hollow roll in roll assemblies of the type herein involved. The outer working surface of the hollow roll then either deflects not at all, or more or less depending on the force provided in opposition to its normal deflection tendency under working conditions, by the pressure applying means on the inside of the roll.

Fundamentally, the present invention is based on the novel concept of proportioning the beam, or of providing it with an extension rigidly connected with its beam length, so that it projects axially from one end of the roll far enough to be engaged by means for holding the beam against rotation. By providing enough length to the beam, or its extension, this means may be located outside of one or another of the necessary frames. Secondly, the hollow roll itself at least at one end, must be provided with a roll neck, or other extension, projecting axially far enough to be engaged by a rotative powering means, it also being possible to locate this rotative powering means on the outside of one or another of the two necessary frame members.

That is to say, one end of a roll assembly incorporating the present invention is like the solid roll constructions of the Love U.S. Pat. No. 864,660 and the Gautschi U.S. Pat. No. 977,725, permitting direct application of rotary power outside of the frame members to the pressure rolling roll at any desired axial distance from its end, while the other end of the assembly has the beam projecting axially from it, or an extension of this beam, permitting the beam to be anchored against rotation at any axial distance desired outside of the frame members.

This new arrangement permits both the beam to be rotatively locked and the pressure rolling roll to be rotatively driven from locations on the outsides of the two frame members and, therefore, avoids all of the complexities involved by a rotary driving arrangement located between these frames. This is effected without sacrificing the advantages of the hollow roll arrangement having inside of it the means for controlling its deflection by transmitting the force to the beam located on the inside of the roll.

Specific examples of work pressure rolling assemblies embodying the principles of the present invention are described below and illustrated by the accompanying drawings in which:

FIG. 3 is a longitudinal section taken on a vertical plane through the work pressure rolling assembly or lower roll of FIG. 1, this being on almost the same scale as FIG. 1;

FIG. 4 is an enlarged scale cross-section taken on the line 4—4 in FIG. 3;

Figure 6:
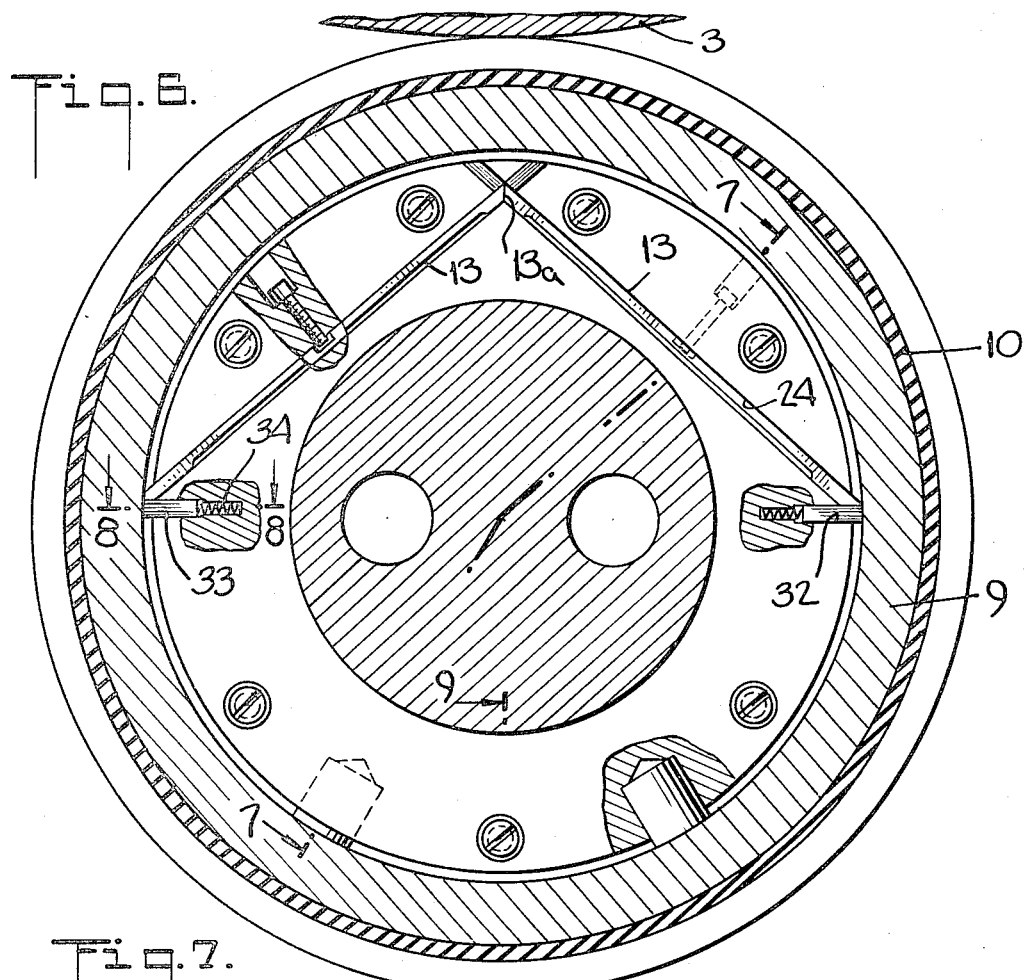
Figures 7, 8, 9:
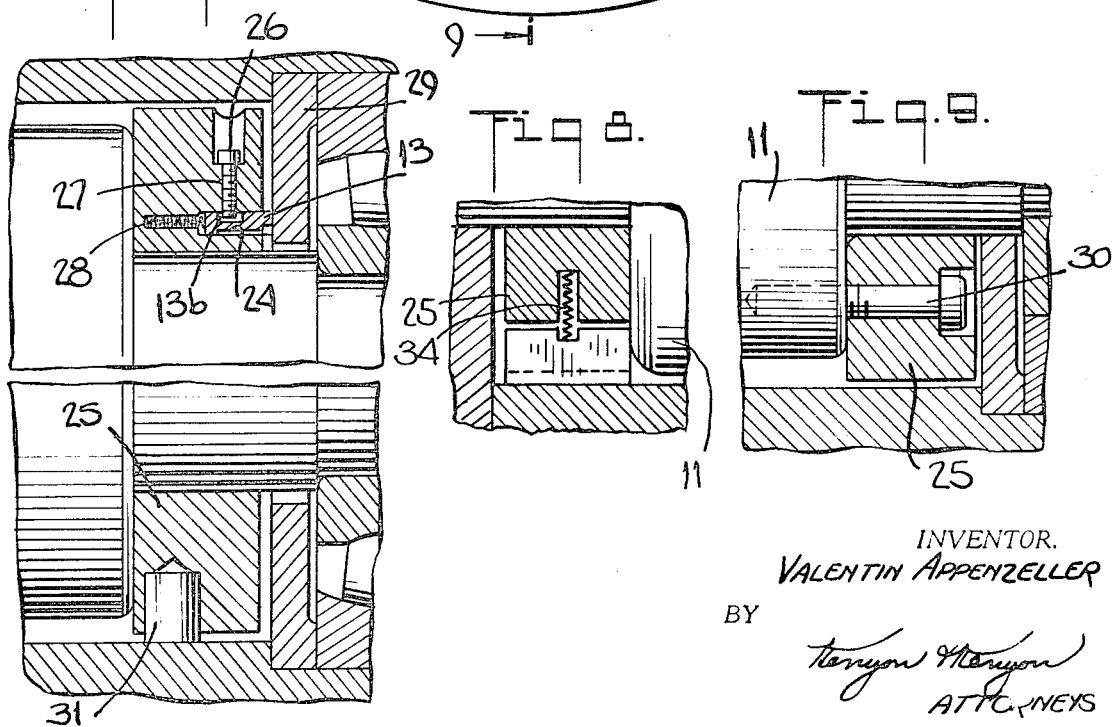

FIG. 5 reveals a detail on a greatly enlarged scale, shown by the right-hand end of FIG. 3;

FIG. 6 is a cross-section taken on the line 6—6 in FIG. 3, this view being on a further enlarged scale relative to FIG. 3;

FIG. 7 is a longitudinal section taken on the line 7—7 in FIG. 6 with the beam and its projecting end shown in elevation;

FIG. 8 is a longitudinal section taken on the line 8—8 in FIG. 6;

FIG. 9 is like FIG. 8, but is taken on the line 9—9 in FIG. 6 with the beam and its projecting end shown in elevation; and FIG. 10 is a longitudinal section on a vertical plane of a work pressure rolling assembly involving a modification relative to the construction shown by FIG. 3.

Figure 1:
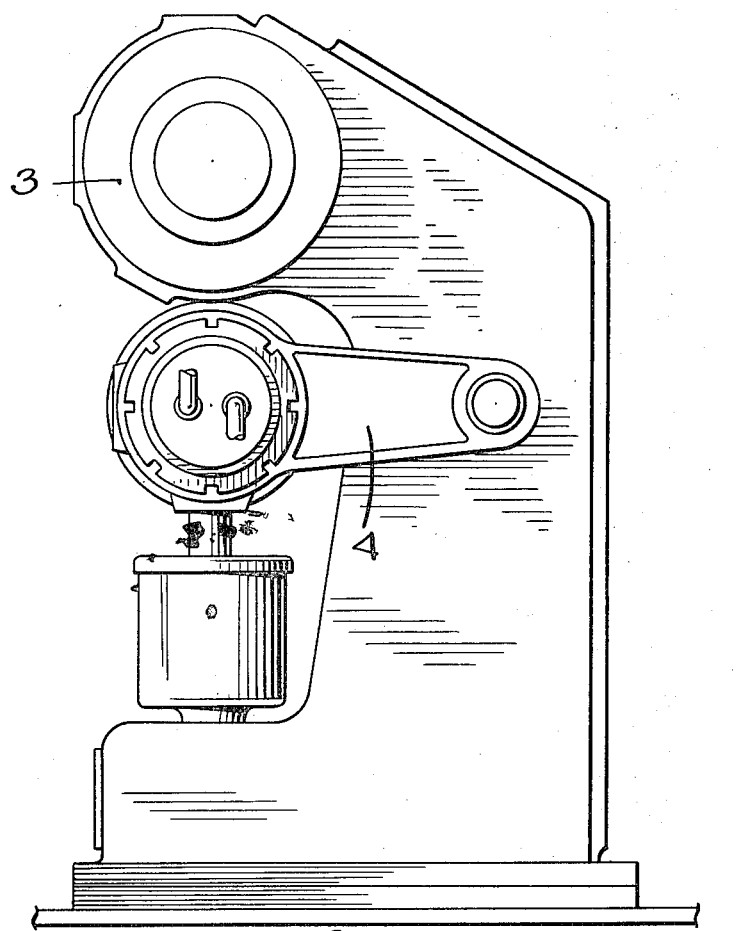
FIG. 1 is a side view showing a side of the frame and the two rolls between which the work is pressure rolled, the upper one of these rolls being a conventional solid roll and the lower one embodying the principles of the present invention.
Figure 2:
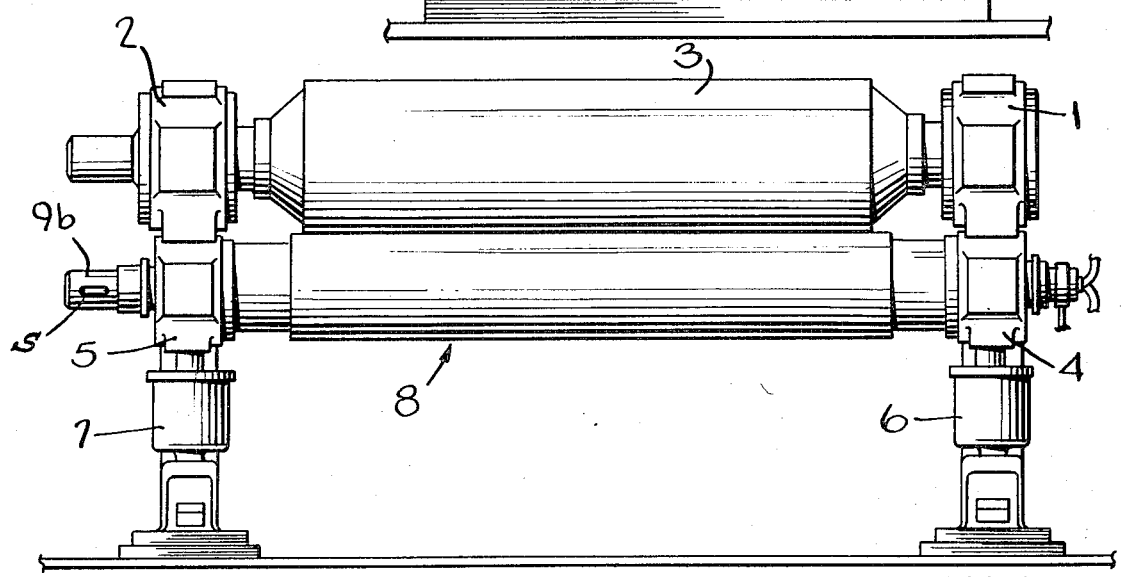
FIG. 2 is a front view of FIG. 1 on a somewhat reduced scale.

Referring to the above drawings, FIGS. 1 and 2 show the two necessary frame members or sides 1 and 2, these journaling by suitable bearings an upper roll 3 of the conventional solid type. It can easily be provided with means to rotate it directly by power applied outside of the frame members.

The frame members 1 and 2 include vertically swinging arms 4 and 5 which serve to mount the work pressure rolling assembly exemplifying the present invention. Hydraulic piston and cylinder assemblies 6 and 7 can swing these arms 4 and 5 upwardly and provide the rolling pressure.

The work pressure rolling assembly itself is indicated generally at 8 in FIGS. 1 and 2, and is shown in detail by FIGS. 3 through 9.

This work pressure rolling assembly includes the hollow roll 9 having an outer work rolling surface shown in this instance as comprising an elastically deformable covering 10 such as might be used when sizing is to be pressure-rolled on a web of material under relatively high pressure and demanding a narrowly restricted range of coating thickness tolerance transversely of the web.

The beam 11 is located within the roll 9 and extends at least for the length of the working portion of the surface 10 to meet the conditions for which it is provided. The means for applying the variable pressure from this beam 11 to the inside of the roll 9 at the location and in a direction providing a reaction to the deflection of this roll 9, in this instance follows the principles of the previously mentioned Appenzeller U.S. Pat. No. 2,908,964. Although not shown, the general principles of the previously mentioned Specht U.S. Pat. No. 2,395,915 might possibly be substituted.

As required by the Appenzeller patent principle, the beam 11 and the roll 9 have co-operating side seals 12 and end seals 13. The outside diameter of the beam 11 is somewhat smaller than the inside diameter of the hollow roll 9 and the seals 12 and 13 divide the resulting space into upper and lower chambers. Liquid under pressure, such as lubricating or other oil from a pressure pump, is fed to the upper chamber through an inlet passage 14 so as to hydraulically apply a uniform pressure to the inside of the hollow roll 9 opposite to the roll 3 and the work passing between these two. A passage 15 serves to exhaust liquid leaked through the seals.

Incidentally, the drawings do not illustrate the work, but it is to be understood that it passes through the nip formed by the two rolls. The passages 14 and 15 are shown in a somewhat idealized form (in actual practice they must be formed by drilling) since this form distinguishes the passage 14 from the outlet passage 15 which connects back to the tank supplying the pressure pump feeding the passage 14.

It is to be understood that the seals need not be absolutely fluid-tight, and that they may be made deliberately to leak more or less so that a flow of liquid is established through the assembly, sometimes done to permit roll temperature control for example. However, the leakage rate must be adjusted to the capacity of the pump (not shown) to keep the upper chamber at the hydraulic pressure selected to provide the desired control of the shape of the roll 9 where it forms the working pass with the roll 3.

As can be seen in FIG. 3, the beam 11 projects axially to the right from and beyond the right-hand end of the roll 9 far enough to be engaged by a means 16 for holding the beam 11 against rotation. Note that this beam end 11a, which might be called more properly an extension 11a of the beam since it is beyond the portion of the beam under beam stress, is so long that it extends through and beyond the frame 4. This means 16 is not shown in FIGS. 1 and 2, but it is to be understood that it may comprise any kind of anchor or lock to prevent rotation of the beam. For example, it may be a bracket keyed to the projecting end 11a and secured against rotation or swinging by being fastened to the arm 4.

At the left-hand end, still referring to FIG. 3, the hollow roll 9 is provided with a roll neck 9a projecting axially far enough outwardly or to the left to be engaged by any suitable rotative powering means. With this in mind, the extreme end portion of the neck 9a which forms a drive shaft S is shown as being provided with a keyway 9b. Thus it can be seen that the hollow roll 9 can be driven in the same manner as though it were either a solid roll as conventionally used or as would be the solid roll in the pressure work rolling assembly shown by the Love and Gautschi patents previously identified. Because the beam extension 11a projects through the end of the roll 9 so that it may be anchored against rotation independently with respect to the roll neck 9a, the new assembly accommodates the more advantageous principles of the Specht and Appenzeller patents, also previously identified.

Note that the beam ends form seats 11b which are journaled by the hollow roll 9 through self-aligning bearings 17 located inside of the roll 9. These bearings are located so that the beam's unsupported span extends for at least the length of the working surface of the roll 9. With hydraulic pressure in the chamber above the seals 12 these bearings are loaded in an opposite direction, or downwardly, and the beam span flexes downwardly with the lower chamber providing clearance. As shown, the beam is positioned with its axis offset upwardly from the roll axis so that this clearance is increased by the extent of this offset.

In addition to the roll neck 9a, the roll 9 has a second roll neck 9c projecting from its right-hand end, this neck being hollow and having an inside diameter proportioned relative to the diameter of the beam extension 11a, to define therebetween space large enough to permit angular motion of the extension 11a which results when the beam 11 deflects. Both necks 9a and 9c are journaled to the arms 4 and 5 through self-aligning rotary bearings 18.

All bearings are shown as self-aligning bearings of the anti-friction type which are preferred for actual use. Such antifriction bearings embody rolling elements such as balls, rollers, or the like.

With this assembly, rotative power can be applied to the left-hand roll neck to drive the hollow roll and work may be fed through the pass formed between the two rolls 3 and 9. If the roll 3 is not driven, the work driven by the powered roll 9 rotates this solid roll 8.

Without hydraulic pressure in the passage 14 and therefore in the upper chamber of the assembly,, the roll 9 will be subject to beam flexure deflection when the cylinders 6 and 7 apply pressure to force the roll assembly upwardly against the reaction of the vertically fixed roll 3. The self-aligning bearings 17 and 18 will accommodate all angular deflections of the two roll necks of the hollow roll relative to the frame members and the beam.

With the introduction of hydraulic pressure through the passage 14, a reaction is provided removing the beam flexure more or less, causing the upper surface of the roll 9 to become less concave or perhaps convex but in most cases linear, but as required by the operations under way in any event. Now, the beam 11 carries the beam stress and it will be subjected to beam flexure and consequent deflection downwardly, the lower chamber forming room for such deflection. This causes angular motion of the necks or end portions 11b, accommodated by the self-aligning bearings 17, while the space between the beam end or extension 11a and the inside of the roll neck 9c provides room for angular motion of this part 11a. The two roll necks 9a and 9c extending outwardly from the hollow roll 9 act to carry the forces and may be subject to angular deflection or beam flexure, but any resulting deflections are accommodated by the self-aligning bearings 18. Such deflection does not affect the portion of the hollow roll controlled by the hydraulic pressure.

This new roll assembly involves unique details of construction described hereinafter, the foregoing serving to disclose the fundamental principles involved.

The modification shown by FIG. 10 illustrates the fact that the principles of the invention may be used in other forms.

In this FIG. 10, although involving somewhat different proportions of parts, it can be seen that the various parts generally correspond to those shown by FIGS. 3 and 4, and therefore, corresponding numerals are used. The main difference is at the right-hand end shown by the lower segment of FIG. 10. Here the roll neck 9c has been eliminated, the beam extension 11a, here marked 11a', is made much more massive and it is this beam extension that is journaled by the bearing 18 which corresponds in location to the bearing 18 in FIG. 3. Although not shown, the outer end of the beam or beam extension 11a' will, of course, be locked against rotation.

In this instance it is the beam end or extension 11a' which serves to mount the right-hand end of the roll assembly, the hollow roll 9 at this end being journaled by that bearing 17 on the beam extension.

In FIG. 10, the necessary longitudinally extending seals are not shown, but the equally necessary end seals 22 are shown as comprising elastically deformable nonmetallic ring elements. Leakage outwardly beyond the ring element at the right-hand end of the beam 11 in both forms is prevented by a ring seal 23 which is elastically deformable in a radial direction. Radial motion must be accommodated because the beam extension 11a' must be able to deflect angularly when the beam 11 deflects in this instance. The end of the roll of this FIG. 10 example, which does not have a roll neck, is provided with an end member 20' which takes the place of the flange 20 of the first example, which is annular and has an inside diameter forming a space adequate for deflection of the beam extension 11a'.

Other details of construction shown by the drawings need no description to understand the principles of this invention, excepting for the end seals defining at the ends of the main body of the beam 11 the upper and lower chambers in the case of the first example shown by FIG. 3. The details of these are described below.

These details are shown by FIGS. 6 through 9 where it can be seen that at each end of the beam 11 the end seals 13 are in the form of metal strips positioned in channels 24 formed in a collar 25 positioned between the end of the beam 11 and the adjacent bearing 17. These channels and the sealing strips extend from locations substantially registering with the side seals 12 diagonally upwardly towards each other so that the ends of the strips meet at the vertical centerline of the collar 25, the strips having mitered ends 13a which abut each other at this point.

The strips are held in the channels by having recesses 13b engaged by cap screws 26 screwed into bores 27 extending radially inwardly from the collar's periphery so that the inner ends of the screws are in the recesses 13b. The latter are large enough to permit some movement of the strips 13 and the latter are urged outwardly towards the bearing 17 by compression springs 28 located in bores extending axially from the bottoms of the channels 24. A flat annular bearing plate 29 is located between the collar 25 and the bearing 17 and against which the seals 13 are resiliently pressed by the springs 28. The collar 25 itself is secured to the end of the beam 11 by cap screws 30, the lower portion of the collar 25 having radially projecting nylon plugs 31 to assist in maintaining the collar 25 concentric with the inside of the roll 9.

At the lower ends of the sealing strips 13 and in substantial registration with the side seals 12, the collar 25 at these diametrically opposite locations has radial channels 32 formed therein which merge with the adjacent portions of the channels 24 and in which radially projecting sealing strips 33 are located. These strips 33 are pressed outwardly by compression springs 34 located in the bottom of the channels 32 and the lower ends of the longer strips 13 bear on these strips 33.

These end seals seal the upper chamber against loss of liquid endwise with respect to the space formed by the side seals 12 between the upper half of the beam 11 and the inside of the hollow roll 9. They resist high hydraulic pressure in the upper chamber particularly well.

Reviewing the foregoing and the FIGS. 1 to 10 of the drawings, it can be seen that in its fundamental form the new roll assembly comprises the beam 11 having the bearing seats 11b on or at its ends and the extension or shaft 11a projecting axially beyond what in the drawings is the right-hand one of the seats. The hollow work rolling roll 9 which is subject to deflection when engaging the work being pressure rolled, is tubular to avoid complicated fabrication. The roll encircles the beam and the seats 11b, and defines the space therearound, the shaft 11a projecting axially beyond the end of the roll adjacent thereto.

The self-aligning rotary bearings 17 on the seats 11b journal the beam and roll together. Keeping the different constructions of FIGS. 3 and 10 in mind, at least one roll neck, 9a for example in FIG. 3, projects axially from the other end of the roll from which the shaft 11a projects. This roll neck has the bearing 18 and extends further axially to permit it to be coupled to a source of rotary power beyond its bearing seat, as illustrated by the keyway 9b.

Means must, of course, be provided for applying the anti-deflection pressure. Preferably this is done by providing the seals 12 and 13 to define a chamber between the beam and the roll opposing the roll's area of deflection and into which hydraulic liquid under pressure may be introduced and maintained.

Finally, there are the different means for forming the necessary second bearing seat for the end of the assembly from which the shaft 11a projects. In FIG. 3 this is the roll neck 9c which also has a seat for the bearing 18 at that end, this neck encircling the shaft 11a while providing clearance for the latter to deflect, the shaft continuing on outwardly so that its end may be locked against rotation. In FIG. 10, the second bearing seat is provided by the shaft 11a' itself, it being made sufficiently massive in this instance to transmit the rolling pressure to the roll assembly through the adjacent bearing 17.

It is to be understood that the bearing 18 on the shaft 11a', in FIG. 10, should not interfere with angular deflection of the shaft but that it need not be rotative.

Practical embodiments of the present invention do not involve construction or assembly problems which cannot be handled by competent engineers and mechanics. The bearing 17 may be installed on the necks of the beam to form a subassembly which is inserted endwise into the hollow roll 9. The interior of this hollow roll 9 should be smoothly finished to reduce the sliding friction between the side seals, held stationary by the beam because fixed to the latter, and the inside of the hollow roll. The nylon plugs 31 previously referred to, provide bearing members sliding easily on the drum's inside during insertion of the subassembly of the beam and its bearings and other parts. This prevents damage to the smooth inside of the hollow drum during assembling operations.

What is claimed is:

1. A work pressure rolling assembly including interspaced frame members, a hollow roll extending transversely between said members with its outside engagable by work between the members, a roll neck connected to one end of said roll for rotating the latter and extending axially therefrom through the adjacent one of said members to the latter's outside, a rotary bearing connecting said neck to said adjacent member, the end of the roll to which this neck is connected being closed and the other end of the roll having an axially extending opening, interspaced rotary bearings on the inside of said roll adjacent to its ends, a deflectable beam inside of said roll and connected thereto by said interspaced bearings and spaced from the roll's inside between these bearings to permit the beam to deflect therebetween, one end of this beam terminating short of the roll's closed end and the other end of the beam having an extension for holding the beam against rotation and extending therefrom through said opening and through the other of said members to the latter's outside, means for connecting said other end of said roll rotatively to said other of said members, said roll being deflectable when said roll's outside is engaged by work with the ends of the roll connected to said frame members, and means for applying pressure between the inside of said roll and said beam to control the deflection of the latter.

2. The assembly of claim 1 in which said means for connecting said other end of said roll to said other of the said members comprises a second roll neck connected to the said roll at its said other end and extending through this other member and a rotary bearing connecting this second roll neck to this other member, this second roll neck having an axially extending opening through which said beam extension projects.

3. The assembly of claim 2 in which all of said rotary bearings are of the self-aligning type.

4. A work pressure rolling assembly including interspaced frame members, a hollow roll that deflects when stressed, means for rotatively connecting said roll transversely to said members with the roll positioned so its outside is adapted to be engaged by work between the members, means extending axially from said roll through one of said members to the outside thereof for rotating the roll, a beam extending axially inside of said roll and which is also deflectable when stressed, means free from at least the longitudinal central portion of said roll for rotatively interconnecting said beam and the roll's inside at positions on both sides of the roll's said central portion, said beam being spaced radially from the roll's inside so the beam and roll can deflect relative to each other for at least substantially the extent of the roll's said central portion, means for applying pressure between said beam and the inside of the roll's said central portion for causing relative deflection of the roll and beam, one end of the roll having an axially extending opening, and an extension connecting with said beam and extending therefrom through said opening and the adjacent one of the frame members to the outside of the latter for holding the beam against rotation with said roll.

5. A work pressure rolling assembly including interspaced frame members, a deflectable hollow roll extending transversely between said members and having an outside work-engaging portion between its ends for applying rolling pressure along one side of the roll, a roll neck for mounting one end of said roll and rigidly extending axially from that one end of the roll through one of said frame members to the latter's outside and having an outer end which is accessible from said outside, a bearing rotatively connecting said neck to said member, interspaced self-aligning rotary bearings inside of said roll and respectively positioned outwardly from the opposite ends of said work-engaging portion of this roll, a deflectable beam inside of said roll and mounted by the latter through said interspaced bearings and spaced from the roll's inside between these bearings to permit the beam and said roll to deflect relative to each other between these bearings, one end of said beam terminating short of said neck's accessible end and the other end of this beam having an extension for holding the beam against rotation and extending therefrom through the other end of said roll and through the other of said frame members to the latter's outside and having an outer end which is accessible from said outside, a second roll neck rigidly extending axially from the other end of said roll to the other of said frame members and having an axial passage through which said beam's extension passes to the outside of this other frame member, a bearing rotatively connecting said second roll neck to said other frame member, and means for forming a fluid pressure chamber extending for the length of said roll's work-engaging portion between the inside of said roll's pressure rolling side and said beam and applying fluid pressure in this chamber substantially uniformly throughout the length of this chamber to said roll's inside and said beam.

6. In a controlled deflection roll and in combination with a second roll forming a pressure nip portion therewith between its ends:
- a cylindrical roll shell forming said portion between its ends,
- a separate roll neck secured to and extending axially outwardly of each end of said shell,
- first bearing means extending about said roll necks and rotatably supporting said roll necks and roll shell,
- a center shaft extending along the interior of said portion of said shell and beyond opposite ends of said portion and having fluid pressure means adapted to apply nip correcting pressure to the inside of said portion of said roll shell,
- drive means having driving connection with one of said roll necks for rotatably driving said shell about said center chaft,
- and spherical self-aligning bearing means supporting said center shaft through said roll necks and said first bearing means and disposed on either side of said nip portion and compensating for bending of said center shaft by said nip correcting means.

7. A controlled deflection roll assembly forming a pressure nip portion between its ends with a second roll comprising:
- a cylindrical roll shell forming said nip portion between its ends,
- a non-rotatable center shaft extending along the interior of said roll shell and beyond opposite ends of said nip portion thereof,
- fluid pressure means on said center shaft adapted to apply nip correcting pressure to the inside of said roll shell,
- support roll necks extending axially beyond opposite ends of said roll shell, coaxial therewith and secured thereto,
- axially spaced bearings rotatably supporting each of said roll necks and said roll shell for rotation about a horizontal axis,
- and spherical self-aligning bearings disposed within the outer axial limits of said axially spaced bearings,
- journaling said roll necks on said center shaft outwardly beyond the ends of said nip portion and spacing said roll shell from said center shaft and accommodating deflection of said center shaft caused by the nip correcting loads between said center shaft and roll shell.

* * * * *